F. C. GOFF.
NUT CRACKING DEVICE.
APPLICATION FILED SEPT. 13, 1915.

1,202,992.

Patented Oct. 31, 1916.
3 SHEETS—SHEET 1.

Witnesses
Otto E. Hoddick.
F. A. Van Rossem.

Inventor
Frank C. Goff.
By A. J. O'Brien
Attorney

F. C. GOFF.
NUT CRACKING DEVICE.
APPLICATION FILED SEPT. 13, 1915.
1,202,992.
Patented Oct. 31, 1916.
3 SHEETS—SHEET 2.
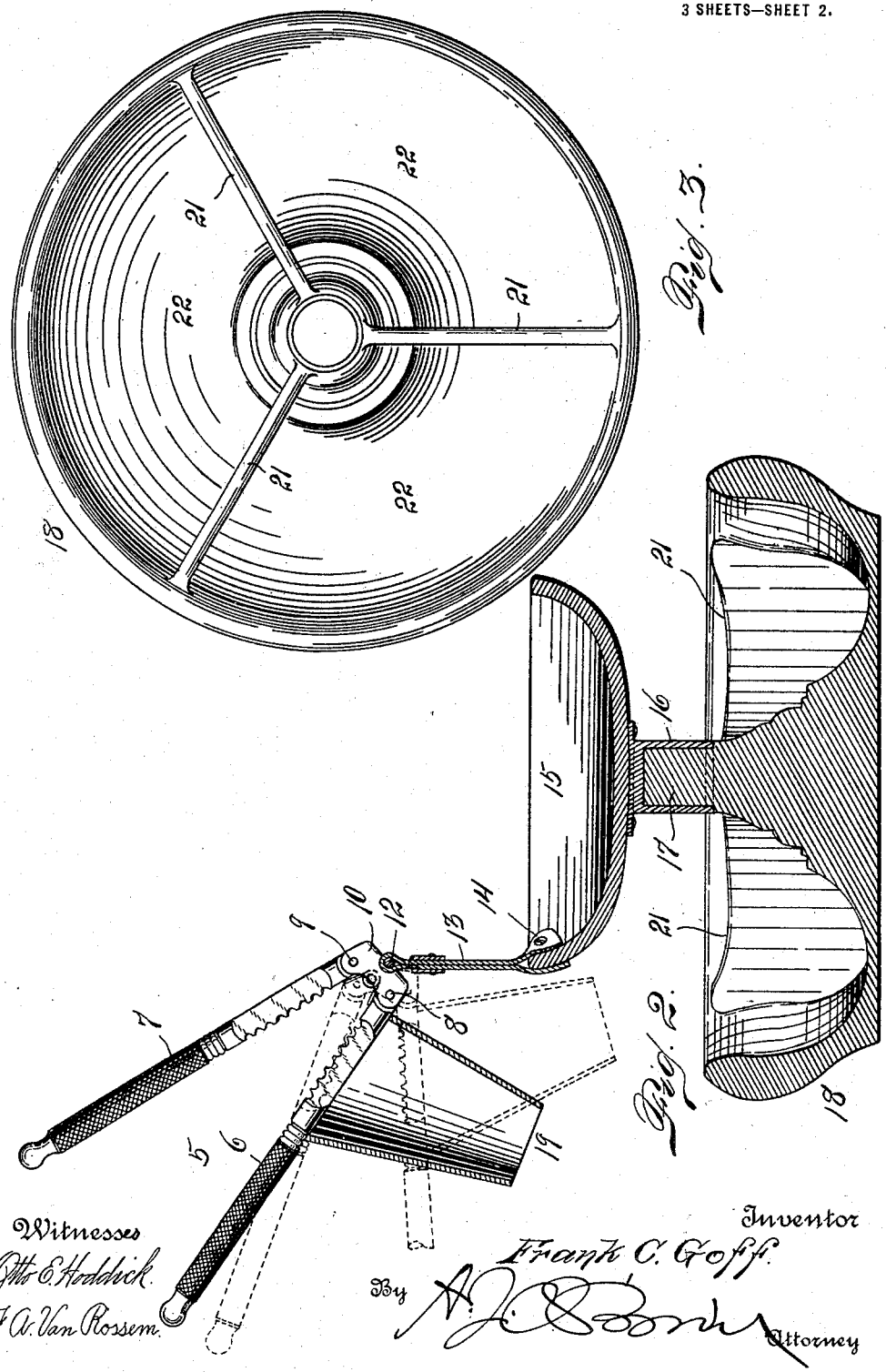
Witnesses
Otto E. Hoddick.
F. A. Van Rossem.
Inventor
Frank C. Goff.
By
Attorney

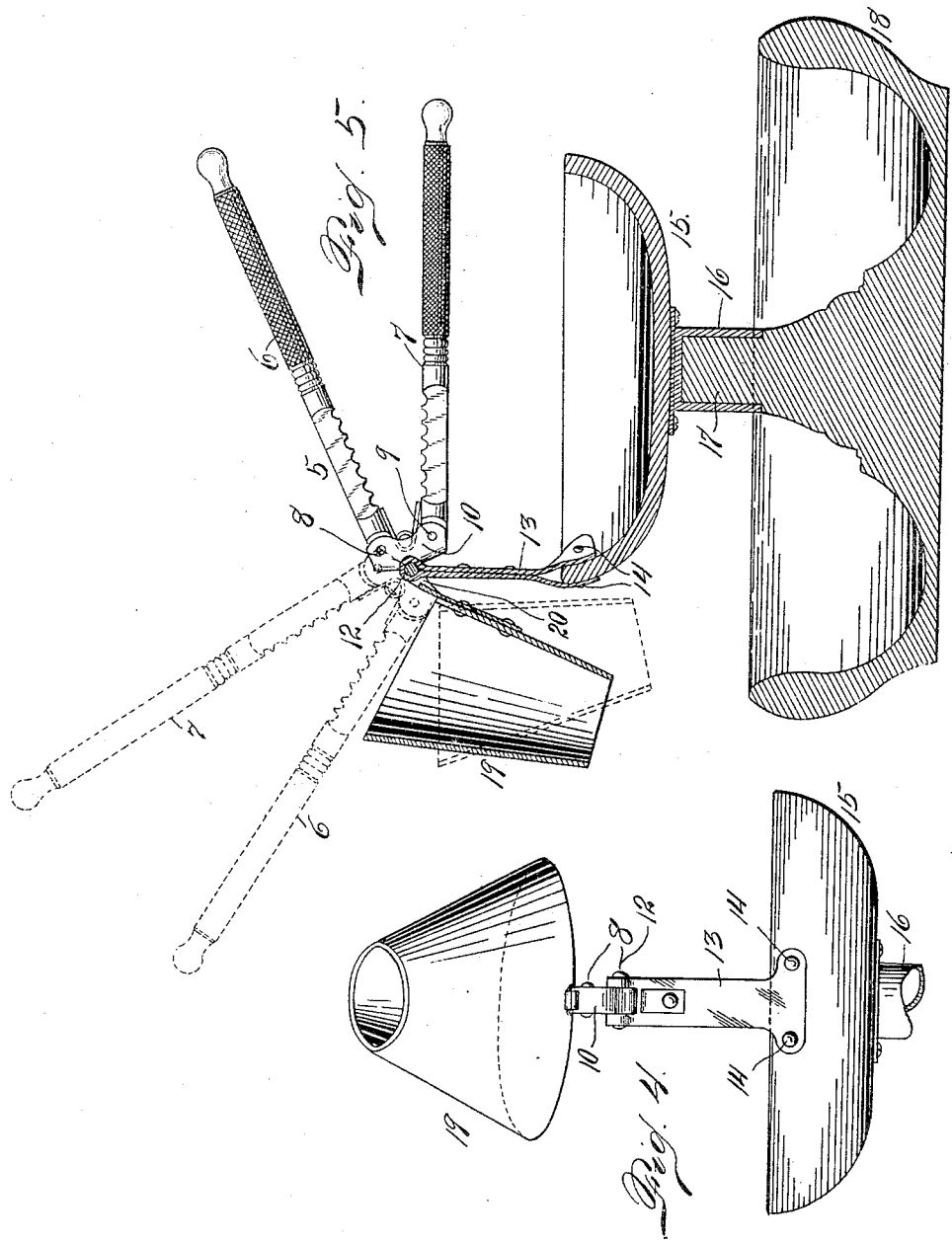

UNITED STATES PATENT OFFICE.

FRANK C. GOFF, OF DENVER, COLORADO.

NUT-CRACKING DEVICE.

1,202,992.　　　　Specification of Letters Patent.　　Patented Oct. 31, 1916.

Application filed September 13, 1915.　Serial No. 50,361.

*To all whom it may concern:*

Be it known that I, FRANK C. GOFF, a citizen of the United States, residing in the city and county of Denver and State of Colorado, have invented certain new and useful Improvements in Nut-Cracking Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in nut cracking devices, my object being to provide a nut cracker constructed and arranged to confine the particles of the cracked nut, and prevent them from flying about promiscuously in the vicinity of the cracker.

My further object is to provide a mounting for the nut cracker proper, of such character that the nuts may be conveniently delivered to a bowl or receptacle.

Another object is to provide a construction of this class whereby the nuts as they are cracked may be discharged into an upper or lower bowl member, the upper bowl member being removably applied to the lower member.

My improvement in its simplest or primary form consists of a nut cracker combined with a hood or guard mounted in suitable proximity thereto. The nut cracking device is adapted to be hingedly connected with a bowl or receptacle for use in connection with the nuts.

The invention will now be described in detail, reference being made to the accompanying drawing, in which is illustrated an embodiment thereof.

Figure 1:
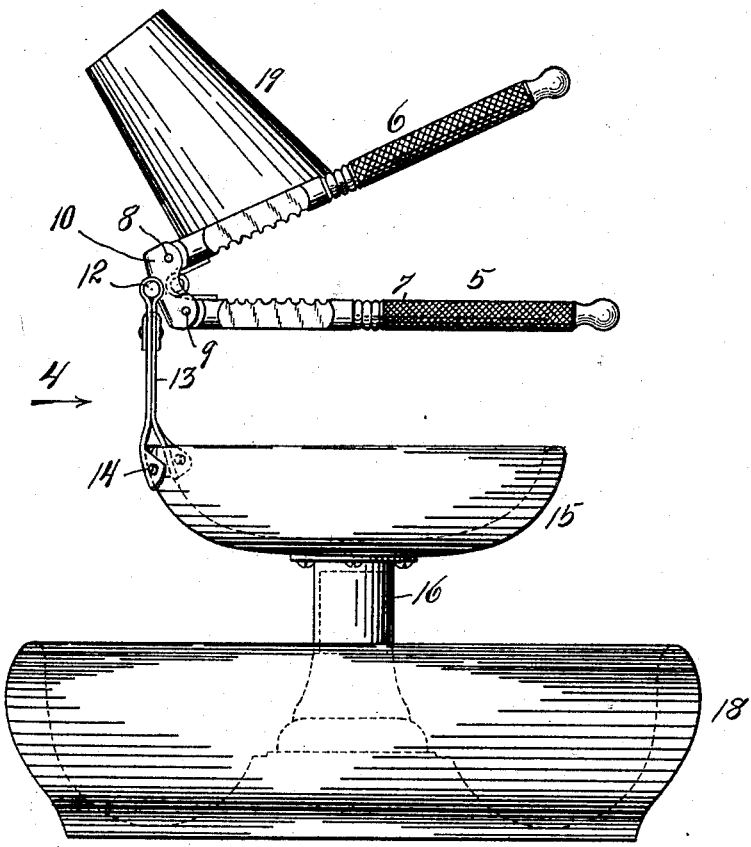
Figure 6:
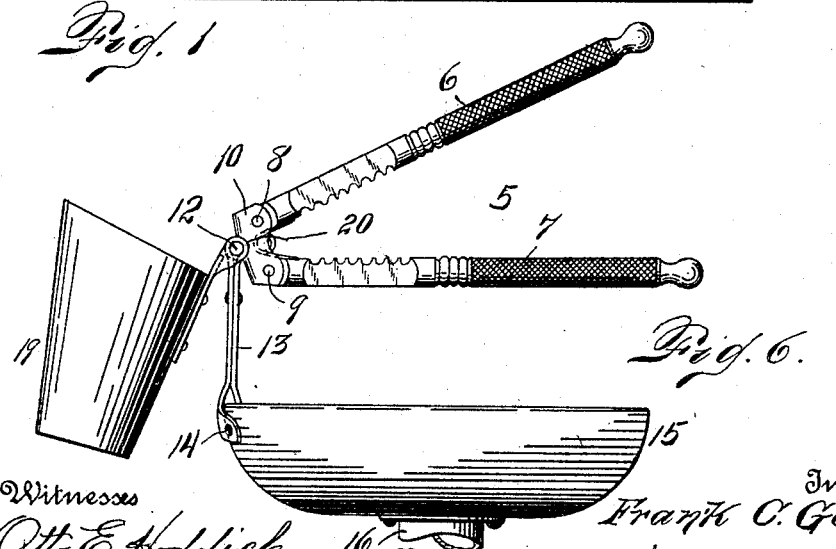

In this drawing, Figure 1 is a side elevation illustrating one form of the nut cracking device or apparatus. Fig. 2 is a view largely in section illustrating the same form of construction, the cracker member however being shown in a different relative position. Fig. 3 is a top plan view of the lower bowl member. Fig. 4 is a view of the upper bowl member showing the cracker member in place thereon. This is a view looking in the direction of arrow 4, Fig. 1, with the upper bowl member removed. Fig. 5 is a view similar to Fig. 2 but showing a slightly modified form of construction. Fig. 6 is a side elevation of the upper part of the device showing the same form of construction as in Fig. 5.

The same reference characters indicate the same parts in all the views.

Let the numeral 5 designate a nut cracker composed of two jaws 6 and 7 hinged as shown at 8 and 9 to a keeper 10, the latter being hingedly connected as shown at 12 to an upright support 13 whose lower extremity is secured as shown at 14 to an upper bowl member 15 whose bottom is equipped with a sleeve 16 adapted to fit over a central top projection 17 of a larger bowl member 18. The bowl member 15 is readily detachable from the member 18 by simply lifting it from its position thereon.

My improvement contemplates a hood or shield adapted to confine the parts of the cracked or broken nut. In the drawing this hood is designated by the numeral 19. In the preferred form of construction this hood is mounted on the jaw member 6 of the cracker and is so arranged that it may project either upwardly or downwardly depending upon the position of the cracker member, that is to say, whether the cracker member is located directly above the bowl member 15 or whether it is swung outwardly away from the member 15 and into such position that the nuts as they are cracked may be discharged or directed into the lower bowl member 18. In another form of construction namely, that illustrated in Figs. 5 and 6 the hood 19 is adjustably mounted on the standard 13 whereby it may be utilized in connection with the cracker member 5 for directing the nuts downwardly either into the bowl member 18 or outside thereof as may be desired. In this form of construction the hood 19 is pivoted as shown at 20 on the same axis as the cracker member, but whereby the hood is adjustable independently of the nut cracker and may be employed in connection with the jaw 6 in all positions of the cracker member, substantially in the same manner as where the hood is connected with the jaw 6 of the cracker member, or the cracker member may be employed independently of the hood if desired.

From the foregoing description the use and operation of my improved nut cracking apparatus will be readily understood. In using the entire construction as illustrated in Fig. 1 the uncracked nuts may be placed in the bowl member 18, and the cracked nuts allowed to fall into the bowl member 15. Or the cracker member may be adjusted to occupy the position shown in Fig. 2, when the nuts may be discharged either outside of the bowl member 18 as indicated by full lines, or thereinto as indicated by dotted lines. When it is desired to discharge the cracked nuts into the bowl member 18, the cracker member may be adjusted to the dotted line position in Fig. 2.

When using the cracker member in the position shown in Fig. 1, the user by placing his hand underneath the jaw member 7, may catch the cracked nuts therein and drop them into the bowl member 15. In this way the pieces of the nuts may be prevented from flying about in any direction. When using the device in the position shown in Fig. 2, the operator may place his hand above the member 7, thus compelling the nuts to pass downwardly through the hood, either into the bowl member 18 or into a receptable outside thereof as may be desired.

When using the form of device shown in Figs. 5 and 6, the cracker member may be employed independently of or in combination with the hood as may be desired. It is assumed that the hood in Figs. 5 and 6 is so mounted on the pivot pin 12, that it will maintain its position when properly adjusted. It may be so tightly pivoted that this condition will result, or provision may be made for securing it in the adjusted position if desired. The only desideratum is that when the hood 19 is adjusted in the form of construction shown in Figs. 5 and 6, it shall be held in the adjusted position.

It is preferred to construct the bowl 18 with partitions 21, dividing the same into a plurality of compartments 22. This is of considerable importance, since different kinds of nuts may be respectively placed in the several compartments. For instance, if the whole nuts are placed in the bowl 18, the different kinds may be placed in these compartments. Again if the whole nuts are placed in the bowl 15, the different kinds of nuts when cracked may be discharged into the several compartments. The bowl member 15 is rotatably adjustable on the projection 17, whereby the nut cracker and the hood may be brought into position to deliver the cracked nuts into any compartment 22.

Having thus described my invention, what I claim is,—

1. The combination with a bowl, of a nut cracker hingedly connected therewith, and a hood arranged in coöperative relation with the bowl and cracker.

2. A device of the class described comprising upper and lower bowl members and a cracker member hingedly connected with the upper bowl member.

3. A device of the class described comprising upper and lower bowl members, and a cracker member composed of two pivoted jaws, the cracker member being hingedly connected with the upper bowl member.

4. The combination of a bowl having a member extending upwardly from the outer edge thereof, and a nut cracker hingedly connected with said member.

5. The combination with a bowl, of a nut cracker mounted on the outer edge of the bowl.

6. The combination with a bowl, of a nut cracker hingedly mounted on the outer edge of the bowl.

7. The combination of a plurality of bowl members, one of said members having a plurality of compartments, and a nut cracker mounted on one of said members.

8. The combination of upper and lower bowl members, the upper bowl member when in its normal position being rotatably adjustable on the lower member, and a nut cracker mounted on the upper member.

9. The combination of upper and lower bowl members, the lower member having a plurality of compartments, and the upper bowl member when in its normal position being rotatably adjustable on the lower member, and a nut cracker mounted on the upper bowl member.

10. The combination of upper and lower bowl members, the lower bowl member having a plurality of compartments, the upper bowl member being adjustable on the lower bowl member, and a nut cracker mounted on the outer edge of the upper bowl member.

11. The combination with a bowl of a nut cracker mounted upon the outer edge of the bowl, and a hood arranged in coöperative relation with the said cracker.

12. The combination of a plurality of bowl members and a nut cracker pivotally mounted upon the outer edge of one of said bowl members.

13. A device of the class described, comprising upper and lower bowl members, and a nut cracker pivotally mounted upon the outer edge of the upper bowl member.

14. A device of the class described, comprising upper and lower bowl members, a nut cracker pivotally mounted upon the outer edge of the upper bowl member, and a hood arranged in coöperative relation with the said nut cracker.

In testimony whereof I affix my signature in presence of two witnesses.

FRANK C. GOFF.

Witnesses:
 GRACE HUSTON,
 A. J. O'BRIEN.